US011972882B2

(12) United States Patent
Craft, Jr. et al.

(10) Patent No.: US 11,972,882 B2
(45) Date of Patent: Apr. 30, 2024

(54) CABLE FOR DISTRIBUTING NETWORK POWER AND DATA

(71) Applicant: CommScope Technologies LLC, Hickory, NC (US)

(72) Inventors: Thomas F. Craft, Jr., Murphy, TX (US); Willis F. James, Wylie, TX (US); David A. Winkler, Arlington, VA (US); Gary L Guilliams, Hayes, VA (US); Randall D. Stevens, Lincolnton, NC (US); Thomas G. Leblanc, Westminster, MA (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 18/160,402

(22) Filed: Jan. 27, 2023

(65) Prior Publication Data

US 2023/0162888 A1 May 25, 2023

Related U.S. Application Data

(63) Continuation of application No. 17/320,519, filed on May 14, 2021, now Pat. No. 11,594,348.
(Continued)

(51) Int. Cl.
*H01B 9/00* (2006.01)
*H01B 7/32* (2006.01)

(52) U.S. Cl.
CPC ............ *H01B 9/003* (2013.01); *H01B 9/005* (2013.01); *H01B 9/006* (2013.01)

(58) Field of Classification Search
CPC ........ H01B 9/003; H01B 9/005; H01B 9/006; H01B 7/328; H01B 7/32; H01B 7/228;
(Continued)

(56) References Cited

U.S. PATENT DOCUMENTS 4,528,420 A * 7/1985 Kish ...................... H01B 7/361 174/112
5,541,803 A * 7/1996 Pope, Jr. .................. H05B 3/56 361/103
(Continued)

FOREIGN PATENT DOCUMENTS

DE 3338232 A1 3/1985
DE 102018217743 A1 4/2020
(Continued)

OTHER PUBLICATIONS

"International Search Report and Written Opinion of the International Searching Authority", International Application No. PCT/US2021/032401, dated Jul. 26, 2021, 9 pp.
(Continued)

*Primary Examiner* — Hoa C Nguyen
*Assistant Examiner* — Amol H Patel
(74) *Attorney, Agent, or Firm* — Myers Bigel, P.A.

(57) ABSTRACT

A power cable or a hybrid power-data cable includes power conductors and a plurality of continuity wires positioned radially outside of the power conductors. The continuity wires are positioned relative to the power conductors such that a cut in the cable will sever one of the plurality of continuity wires before a cut into the power conductors can occur.

21 Claims, 6 Drawing Sheets

Related U.S. Application Data

(60) Provisional application No. 63/026,291, filed on May 18, 2020.

(58) Field of Classification Search
CPC ........ H01B 7/226; H01B 7/225; H01B 7/221; H01B 7/22
See application file for complete search history.

(56) References Cited

U.S. PATENT DOCUMENTS

| | | | | |
|---|---|---|---|---|
| 5,862,030 | A | 1/1999 | Watkins et al. | |
| 6,236,789 | B1 | 5/2001 | Fitz | |
| 10,388,429 | B1 * | 8/2019 | McNutt | H01B 11/22 |
| 10,770,203 | B2 | 9/2020 | Craft et al. | |
| 2004/0160331 | A1 | 8/2004 | Chiu | |
| 2005/0128661 | A1 | 6/2005 | Maeckel et al. | |
| 2016/0109394 | A1 | 4/2016 | Auzanneau et al. | |
| 2019/0334578 | A1 * | 10/2019 | Yates | H01B 7/04 |
| 2020/0317070 | A1 * | 10/2020 | Fuhrer | H01B 9/02 |
| 2021/0394629 | A1 | 12/2021 | Haas et al. | |

FOREIGN PATENT DOCUMENTS

| | | | |
|---|---|---|---|
| GB | 1037071 | A * | 7/1966 |
| GB | 1037071 | A | 7/1966 |
| WO | 2018017544 | A1 | 1/2018 |
| WO | 2021050324 | A1 | 3/2021 |

OTHER PUBLICATIONS

Commscope , "Heliax® FiberFeed Hybrid Cable, Fiber + Power Connectivity, Single-Cable Power and Fiber Solution", Tray Rated Remote Radio Hybrid with Corrugated Aluminum Shield, Fiber Cable: Two 12-fiber Subunits, Copper Conductors: 6X6AWG THWN/THHN and Two 18AWG Copper Conductors, NEC Type: (UL) and c(UL) Type TC-ER, Jun. 27, 2013, 1 p.

Commscope , "Heliax® FiberFeed Hybrid Cable, Fiber + Power Connectivity, Single-Cable Power and Fiber Solution", Tray Rated Remote Radio Hybrid with Corrugated Aluminum Shield, Fiber Cable: Three 12-fiber Subunits, Copper Conductors: 10X6AWG THWN/THHN and Two 18AWG Copper Conductors, NEC Type: (UL) and c(UL) Type TC-ER, Aug. 15, 2013, 1 p.

Commscope , "Heliax® FiberFeed® Hybrid Cable, Fiber + Power Connectivity, Single-Cable Power and Fiber Solution", Tray Rated Remote Radio Hybrid with Corrugated Aluminum Shield, Fiber Cable: Two 12-fiber Subunits, Copper Conductors: 12X6AWG THWN/THHN and 18X18AWG Alarm Wires, NEC Type: (UL) and c(UL) Type TC-ER, Feb. 25, 2014, 1 p.

Stevens, Randall , "Hybrid Cable for Distributed Power Connectivity", U.S. Appl. No. 62/900,408, filed Sep. 13, 2019, 59 pp.

* cited by examiner

CABLE FOR DISTRIBUTING NETWORK POWER AND DATA

CROSS-REFERENCE TO RELATED APPLICATION

The present application is a continuation of U.S. patent application Ser. No. 17/320,519 filed May 14, 2021, which application claims priority to U.S. Provisional Patent Application Ser. No. 63/026,291, filed May 18, 2020, the entire content of which is incorporated herein by reference.

FIELD

The present disclosure relates to communication systems and, in particular, to communications systems that deliver power as well as data to remote nodes.

BACKGROUND

In many information and communication technology systems, network-connected electronic devices are deployed in locations where a local electric power source is not available. With the proliferation of the Internet of Things ("IoT"), autonomous driving, fifth generation ("5G") cellular service, and the like, it is anticipated that network-connected electronic devices will increasingly be deployed at locations that lack a conventional electric power source.

Electric power may be provided to such remote network-connected electronic devices in numerous ways. For example, a local electric utility company can install a connection that connects the remote network-connected electronic devices to the electric power grid. This approach, however, is typically both expensive and time-consuming, and unsuitable for many applications. Composite power-data cables can also be used to power remote network-connected electronic devices and provide data connectivity thereto over a single cabling connection. Power-plus-fiber cables are an example of a type of composite power-data cable that includes both power conductors and optical fibers within a common cable jacket.

DETAILED DESCRIPTION

Figure 1:
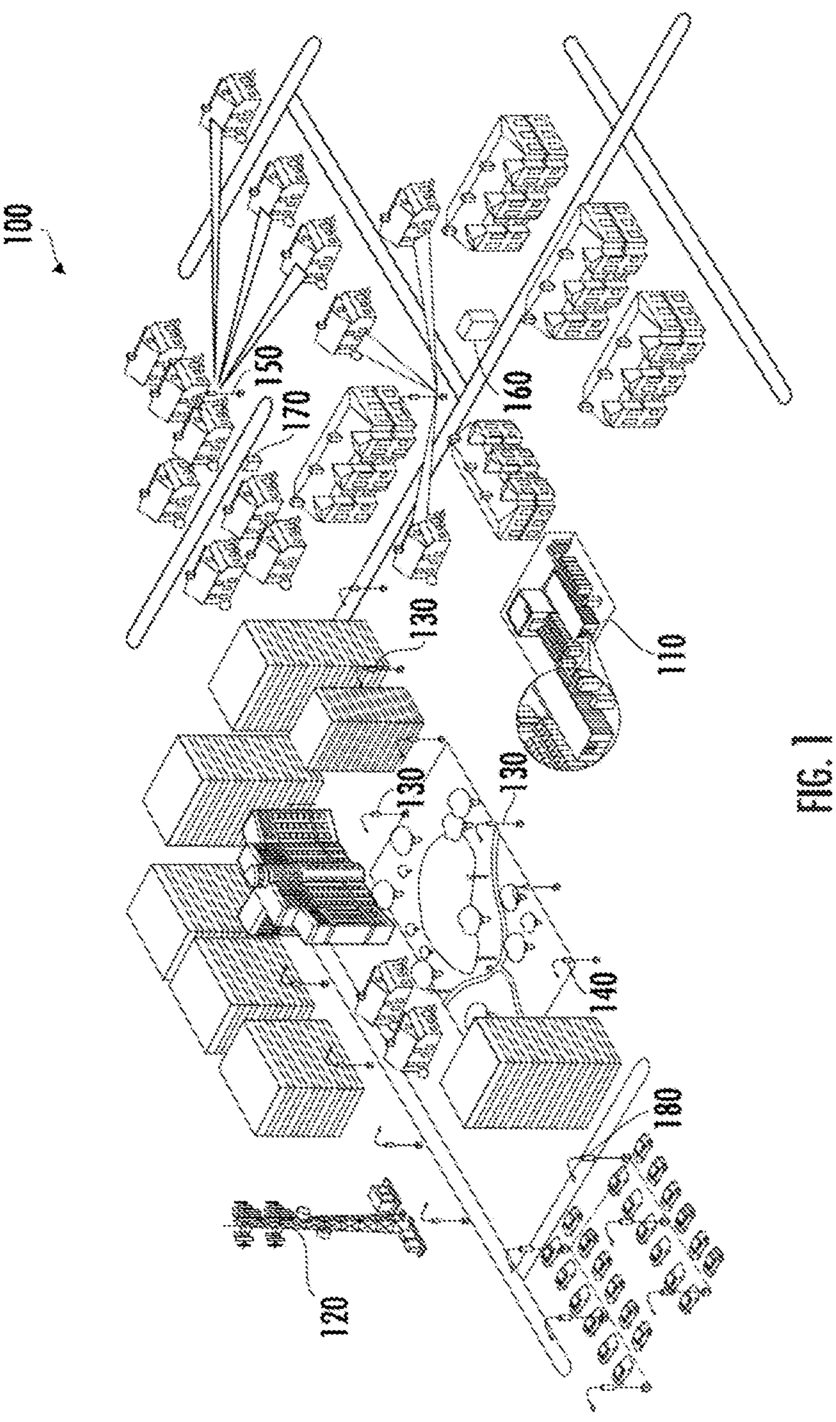
FIG. 1 is a schematic diagram illustrating the increasing power and data connectivity needs for information and communication technology infrastructure in high density access networks.

Pursuant to embodiments of the present inventive concepts, improved cables, such as composite power and fiber optic data cables and power cables, are provided for data/power grids. For example, it may be desirable to provide in-line distribution of both power and data to radio nodes and other electronic devices in an outside plant environment. This may avoid the need for a local electric power source at each radio node or other electronic device. Electric power can be delivered over insulated metal (e.g., copper) conductors, while the data is often delivered over optical fibers. The insulated metal conductors and the optical fibers can be included in separate cables or a composite or hybrid cable that includes both the insulated metal conductors and the optical fibers may be used to deliver both power and data to one or more remote electronic devices. In some environments it may be desirable to provide only the distribution of power in the cable while in other environments it may be desirable to provide both power distribution and data in a single composite cable. In outside plant environments, such cables are often buried underground, or otherwise located, where the cables are potentially accessible. It is known, for example, that such cables may be inadvertently cut as a result of digging near a buried cable or otherwise damaged even where a cable is suspended above-ground. Power cables or composite power-data cables used, for example, in an outside plant environment for a communications network, may carry electric power signals having voltage and/or current levels (e.g., ±190 Volts) that may result in a safety or fire hazard if the cable is severed while in use.

According to embodiments of the present inventive concepts, a power cable and/or a composite power-data cable may comprise continuity wires that carry communication and control signals that are used to sense when the cable is cut so that the electric power that is provided to the power conductors of the cable may be shut off in response to sensing such a cut to the cable. The continuity wires are arranged such that the cut in the cable may be sensed before the power conductors are cut regardless of the orientation of the cable.

Cellular data traffic has increased by about 4,000 percent over the last decade, and is expected to continue increasing at a rate of over 50% per year for at least the next several years. Cellular operators are beginning to deploy 5G cellular networks in an effort to support the increased cellular data traffic with better coverage and reduced latency. One expected change in the cellular architecture that is anticipated with the roll-out of 5G networks is a rapid increase in the number of so-called small cell base stations that are deployed. Generally speaking, a "small cell" base station refers to an operator-controlled, low-power radio access node that operates in the licensed spectrum and/or that operates in the unlicensed spectrum. The term "small cell" encompasses microcells, picocells, femtocells, and metrocells that support communications with fixed and mobile subscribers that are within, for example, between about 10 meters and 300-500 meters of the small cell base station, depending on the type of small cell used.

Small cell base stations are typically deployed within the coverage area of a base station of the macrocell network, and the small cell base stations are used to provide increased throughput in high traffic areas within the macrocell. This approach allows the macrocell base station to be used to provide coverage over a wide area, with the small cell base stations supporting much of the capacity requirements in high traffic areas within the macrocell. In heavily-populated urban and suburban areas, it is anticipated that more than ten small cells will be deployed within a typical 5G macrocell to support the increased throughput requirements. As small cell base stations have limited range, they must be located in close proximity to users, which typically requires that the small cell base stations be located outdoors, often on publicly-owned land, such as along streets. Typical outdoor locations for small cell base stations include lamp posts, utility poles, street signs, and the like, which are locations that either do not include an electric power source, or include a power source that is owned and operated by an entity other than the cellular network operator. A typical small cell base station may require between 200-1,000 Watts of power.

As small cell base stations are deployed in large numbers, providing electric power to the small cell base station locations represents a significant challenge. To meet these goals, cellular operators can benefit from a repeatable process for delivering electric power to small cell base station locations that preferably does not require involvement of third parties such as electric utility companies.

One solution that has been developed for powering small cell base stations uses composite power-data cables. Composite power-data cables allow a cellular network operator to deploy a single cable between a hub and a node such as a small cell base station that provides both electric power and backhaul connectivity to the small cell base station. The hub may be, for example, a central office, a macrocell base station, or some other network operator owned site that is connected to the electric power grid.

According to U.S. Pat. No. 10,770,203, the entire disclosure of which is hereby incorporated by reference herein, power and data connectivity micro grids may be provided for information and communication technology infrastructure, including small cell base stations. These power and data connectivity micro grids may be owned and controlled by cellular network operators, thus allowing the cellular network operators to more quickly and less expensively provide power and data connectivity (backhaul) to new small cell base stations. The power and data connectivity micro grids may be cost-effectively deployed by over-provisioning the power sourcing equipment and cables that are installed, to provide power and data connectivity to new installations, such as new small cell base station installations.

The power and data connectivity micro grids may include a network of composite power-data cables that are used to distribute electric power and data connectivity throughout a defined region. The composite power-data cables may be implemented as, for example, power-plus-fiber cables, as such cables have significant power and data transmission capacity. Each micro grid may include a network of composite power-data cables that extend throughout a geographic area. The network of composite power-data cables may be designed to have power and data capacity far exceeding the capacity requirements of existing nodes along the micro grid. Because such excess capacity is provided, when new remote network-connected devices are installed in the vicinity of a micro grid, composite power-data cables can be routed from tap points along the micro grid to the location of the new remote network-connected device (e.g., a new small cell base station). The tap points allow for daisy chain operation and/or splitting of the power and data signal. The newly installed composite power-data cables may themselves be over-provisioned and additional tap points may be provided along the new composite power-data cabling connections so that each new installation may act to further extend the footprint of the micro grid. In this fashion, cellular network operators may incrementally establish their own power and data connectivity micro grids throughout high density areas. In many cases, the only additional cabling that will be required to power such new base stations is a relatively short composite power-data cable that connects the new small cell base station to an existing tap point of the micro grid. Depending on the system architecture, separate power cables and fiber optic cables may be used at the small cell base station to separately deliver power and data to the base station equipment such as the radios.

The power delivery component of the power and data connectivity micro grids may comprise a low voltage, direct current ("DC") power grid in some embodiments. The DC power signals that are distributed over the micro grid may have a voltage that is higher than the (AC) voltages used in most electric utility power distribution systems (e.g., 110 V or 220 V AC), which may help reduce power loss, but the voltage may be lower than 1500 V DC so as to qualify as a low voltage DC voltage under current standards promulgated by the International Electrotechnical Commission (IEC). For example, the micro grid may carry a 380 V DC power signal (or some other DC voltage greater than 48-60 V and less than 1500 V). The 380 V DC power signal may comprise a +/−190 V DC power signal in some embodiments.

FIG. 1 is a schematic diagram illustrating an embodiment of a high density access network in which the cables of the present invention may be used. As shown in FIG. 1, in an urban or suburban environment 100, a telecommunications provider, such as a cellular network operator, may operate a central office 110 and a macrocell base station 120. In addition, the telecommunications provider may operate a plurality of small cell base stations 130, WiFi access points 140, fixed wireless nodes 150, active cabinets 160, DSL (e.g., G.fast) distribution points 170, security cameras 180, and the like. All of these installations may require DC power to operate active equipment, and most, if not all, of these installations may also require data connectivity either for backhaul connections to the central office 110 and/or for control or monitoring purposes. To reduce costs and increase the speed at which electric power and data connectivity can be deployed to remote network-connected powered devices such as the remote devices 130, 140, 150, 160, 170, 180 illustrated in FIG. 1, the use of power-plus-fiber cables has been proposed. For example, PCT Publication No. WO 2018/017544 A1, which is incorporated herein in its entirety by reference, discloses an approach for providing power and data connectivity to a series of remote powered devices in which power-plus-fiber cables extend from a power source to a plurality of intelligent remote distribution nodes. Each intelligent remote distribution node may include a "pass-through" port so that a plurality of remote distribution nodes may be coupled to the power source in "daisy chain" fashion. Intelligent remote powered devices may be connected to each intelligent remote distribution node and may receive power and data connectivity from the intelligent remote distribution node.

According to U.S. Pat. No. 10,770,203, the power source equipment and remote distribution node approach disclosed in PCT Publication No. WO 2018/017544 A1 may be extended so that cellular network operators may create a hard wired power and data connectivity micro grid throughout high density urban and suburban areas. As new installations (e.g., new small cell base stations 130, security cameras 180, and the like) are deployed in such areas, the cellular network operator may simply tap into a nearby portion of the micro grid to obtain power and data connectivity without any need to run cabling connections all the way from the power and data source equipment to the new installation.

Figure 2:
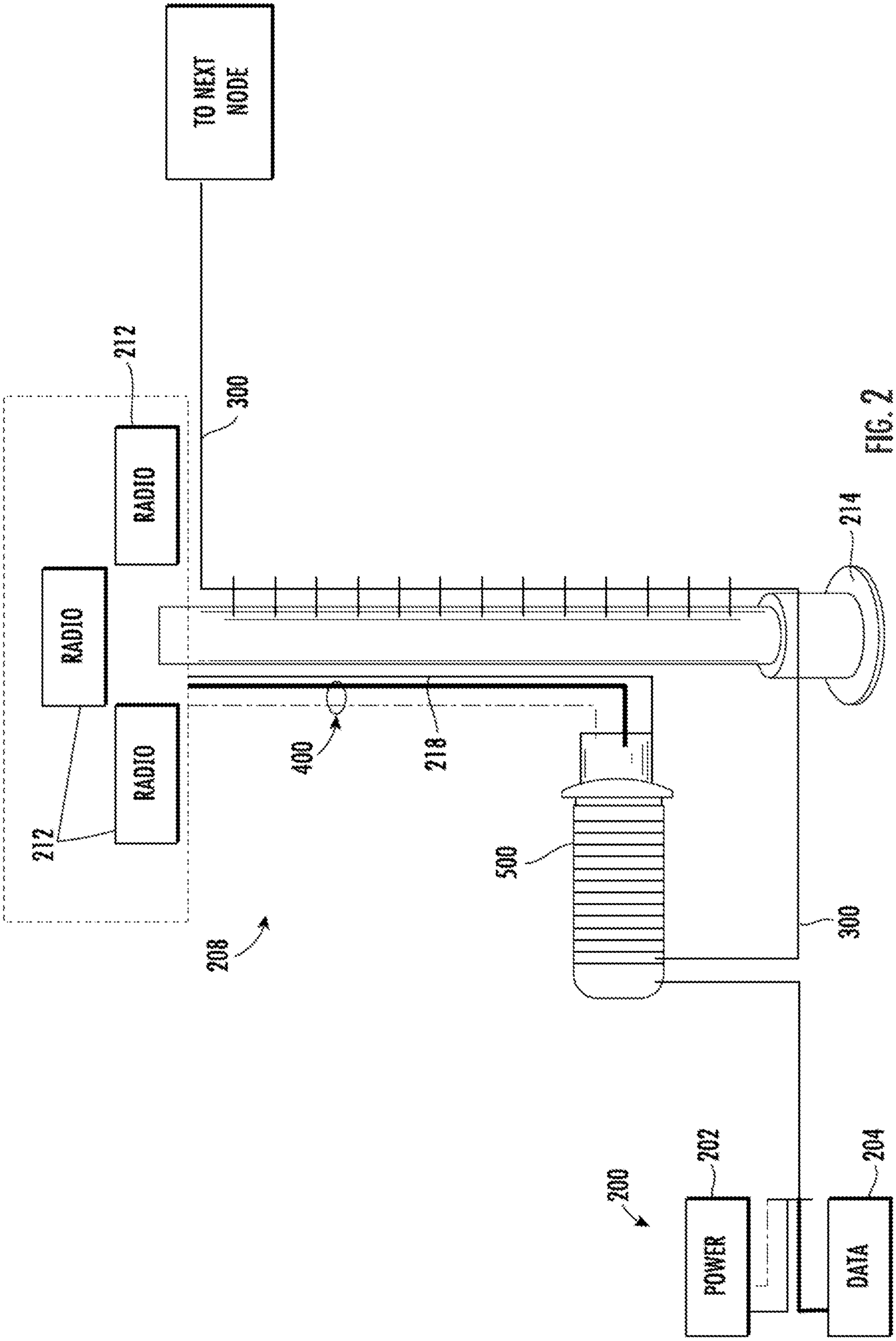
FIG. 2 is a schematic diagram illustrating an embodiment of a node on a network such as shown in FIG. 1.

Referring to FIG. 2, a schematic view of an embodiment of a portion of a network architecture is shown. A plant 200 provides distributed power from a power source 202 and data from a data source 204 to the network. The power and data may be delivered using the hybrid power-data cables 300, as will be described herein, to nodes 208 on the network. In the illustrated embodiment, the node 208 is a small cell base station comprising radios 212 mounted on a support structure 214 such as a tower. In some embodiments, at each node 208 a tap point 500 may be provided along the composite power-data cable 300 that allow for daisy chain operation and/or splitting of the power and data signals. As shown in FIG. 2, tap point 500 separately delivers the power and data to the equipment at the node. The data may be delivered over a separate data line 218 such as a fiber optic cable. The power may be delivered using a power cable 400 as will be described herein. Separating the power and data at the node may be necessitated by the service provider's equipment architecture. Separating the power and data at the node also may facilitate maintenance and repair.

Figure 3:
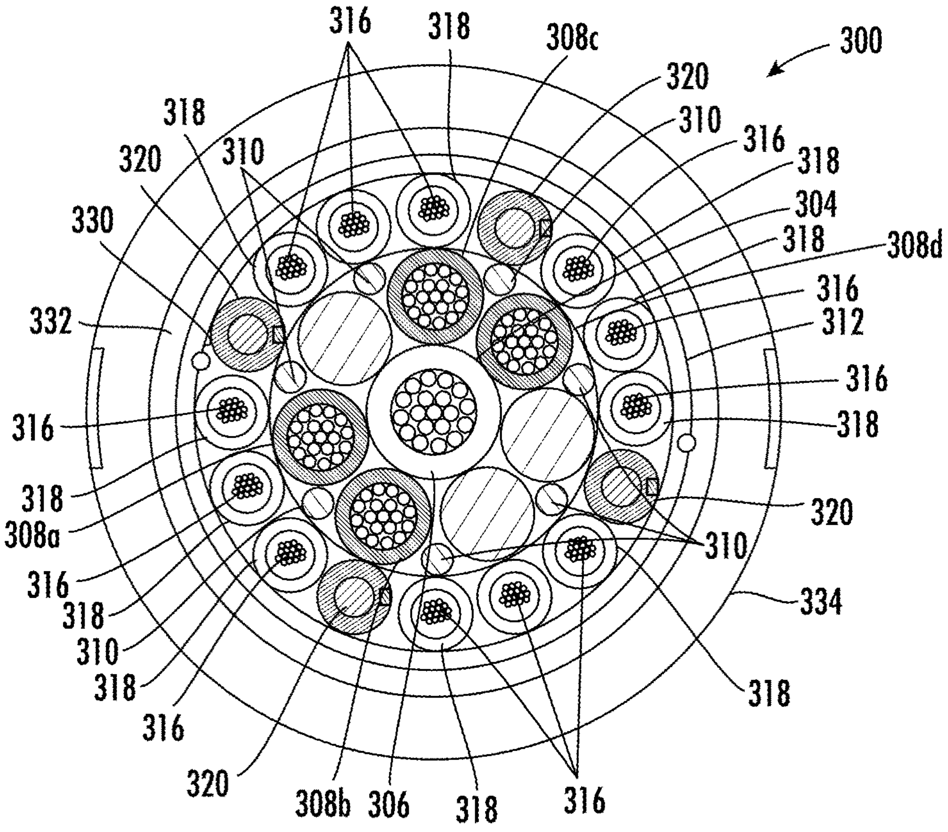
FIG. 3 is a cross-section view of a composite power-data cable according to further embodiments of the present inventive concepts.

FIG. 3 shows an embodiment of a composite power-data cable 300. The composite power-data cable 300 may comprise a central member 304 that may be made of a suitable flexible, dielectric material such as a glass reinforced plastic rod. The glass reinforced rod may be made of pultruded glass/resin. The central member 304 acts a reinforcement member to prevent buckling and stretching of the composite power-data cable 300. In some embodiments, the glass reinforced rod may be covered in a polyethylene coating 306 to provide the central member 304 of a desired diameter for proper sizing of the composite power-data cable 300.

Four power conductors 308*a-d* are provided adjacent to the central member 304. Two of the power conductors 308*a* and 308*b* may be used to provide the minus voltage and two of the power conductors 308*c* and 308*d* may be used to provide the plus voltage. In other embodiments, two of the power 308 conductors may carry a ground voltage while the other two power conductors 308 may carry either a plus voltage or a minus voltage. Each power conductor 308*a-d* may comprise, for example, a 12 gauge wire comprised of multiple strands of copper in a jacket of PVC with a nylon coating. In one embodiment, 19 strands of copper are used to make the 12 gauge wire. Such a power conductor is commonly referred to as THWN conductor. The power conductors 308*a-d* may be arranged with the two minus power conductors 308*a* and 308*b* arranged adjacent to one another and the two plus power conductors 308*c* and 308*d* arranged adjacent to one another where the two minus power conductors 308*a* and 308*b* are spaced from the two plus power conductors 308*c* and 308*d*. This arrangement lowers the chance that a plus power conductor 308*c* and 308*d* and a minus power conductor 308*a* and 308*b* will be inadvertently cut simultaneously.

A plurality of filler members 310 may be provided outside of the central member 304 and adjacent to and between the power conductors 308*a-d* to define a generally cylindrically shaped elongated member. The filler members 310 may comprise polyethylene rods. While three larger diameter filler members and seven smaller diameter filler members are shown, it is to be understood that this arrangement is for illustrative purposes and that a greater or fewer number of filler members 310 may be used and the filler members may be of the same or different diameters. For example, in one embodiment only the three larger diameter filler members 310 may be used to create a generally circular cross-section.

The central member 304, power conductors 308*a-d* and filler members 310 may be covered by a water blocking tape layer 312. The water blocking tape layer 312 may comprise a non-woven tape having a thickness of approximately 10 mils or less. The water blocking tape 312 may be longitudinally wrapped around the power conductors 308*a-d* and filler members 310 and held in position by binder yarns.

Positioned in a layer outside of the water blocking tape layer 312 are the optical fibers 316 and continuity wires 320. The optical fibers 316 may arranged in groups. In one embodiment, 144 individual optical fibers 316 may be provided arranged in twelve groups or bundles of loose fibers laid helically in respective buffer tubes 318 with each group or bundle comprising twelve optical fibers 316. A water blocking structure may be provided in buffer tubes 318 such a water absorbing polymer in a polyester yarn.

As shown in FIG. 3, a plurality of continuity wires 320 are disposed in the same layer with the optical fibers 316. Each continuity wire 320 may comprise stranded wire such as 18 gauge wire made of 16 individual copper strands. Because the continuity wires 320 only carry communication and control signals the continuity wires 320 may have a higher gauge (thinner wire) as compared to the power conductors 308. The copper strands may be jacketed in PVC with a nylon coating. The continuity wires 320 carry low voltage communication and control signals for the system in which the composite power-data cable 300 is deployed. The jacket of the continuity wires 320 may include indicia such as symbols, words or the like indicating that the continuity wires 320 are not the high voltage power conductors 308. The indicia may comprise, for example, colored stripes.

Figure 7:
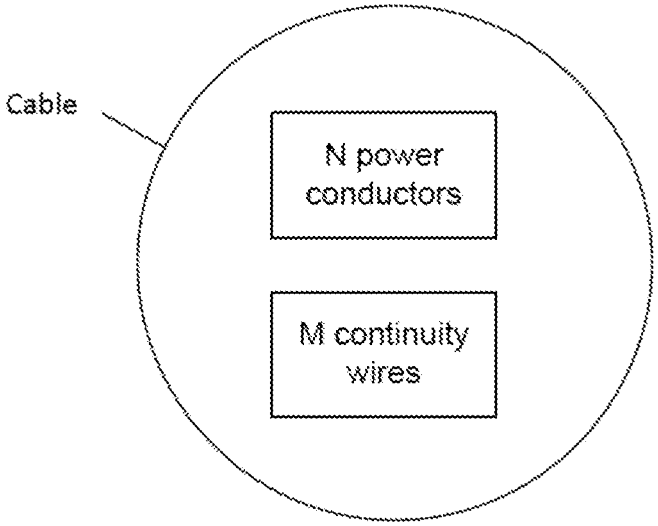
FIG. 7 is a block diagram of a cable including N conductors and M continuity wires, according to embodiments of the present inventive concepts.

The continuity wires 320 are positioned such that a cut in the composite power-data cable 300 will sever one of the continuity wires 320 before a cut into the power conductors 308*a-d* (or at least a cut into two power conductors carrying different voltage power signals) can occur. The severing of a continuity wire 320 interrupts the communication and control signals carried by the continuity wire causing an interruption of the power delivered over the power conductors 308*a-d* to: 1) prevent potential safety and fire hazards that may result from the severing of the power conductors 308*a-d*, and 2) notify the network operator that a cut in a cable has occurred. In certain systems, power shut down can occur in less than 10 milliseconds after the severing of a continuity wire 320. In the illustrated embodiment, four continuity wires 320 are used. In some embodiments, when the composite power-data cables 300 are connected in the network, the continuity wires 320 are connected in loops such that the continuity wires 320 are disposed as pairs where two of the continuity wires 320 are arranged as a first pair forming a first loop and two of the continuity wires 320 are arranged as a second pair forming a second loop. In such a network deployment, the continuity wires 320 may be connected as pairs such that the cable 300 may have, for example, 2, 4, 6, 8 or more even numbers of continuity wires 320. A generic diagram showing possible configurations of continuity wires is shown in FIG. 7. In networks where the continuity wires 320 are not connected in loops an odd number of continuity wires may be used in the composite power-data cable 300. The arrangement of the continuity wires 320 will be described in greater detail below.

The fiber optic buffer tubes 318 and the continuity wires 320 may be covered in a water blocking tape layer 330. The water blocking tape layer 330 may comprise a non-woven tape having a thickness of approximately 10 mils or less. The water blocking tape may be longitudinally wrapped around the fiber optic buffer tubes 318 and the continuity wires 320 and held in position by binder yarns.

A corrugated laminated aluminum layer 332 may surround the water blocking tape layer 330. The corrugated laminated aluminum layer 332 may comprise 10-12 mils thick layer of corrugated aluminum with an ethylene ethyl acrylate (EAA) coating that is longitudinally wrapped around the water blocking tape layer 330. An outer jacket 334 may surround the corrugated laminated aluminum tape layer 332 and form the exterior of the composite power-data cable 300. The outer jacket 334 may be made of a suitable flexible, electrically and environmentally insulating material such as polyvinyl chloride (PVC).

As previously explained, the continuity wires 320 are positioned such that a cut in the composite power-data cable 300 will sever at least one of the continuity wires 320 before a cut into the power conductors 308*a-d* can occur. In the illustrated embodiment, the continuity wires 320 are arranged radially outside of and surrounding the power conductors 308*a-d*. It is to be appreciated that the power conductors 308*a-d*, filler members 310, fiber optic bundles 318 and the continuity wires 320 are arranged in a generally helical configuration such that the absolute positions of these components vary along the length of the cable while the relative positions of the components is relatively constant over the length of the cable. As a result, in a buried cable, the components may be in any radial spatial position relative to the cable exterior. Because of this, the continuity wires 320 are positioned such that the continuity wires 320 are cut before the power conductors 308*a-d* are cut regardless of where the cut occurs on the composite power-data cable 300.

The continuity wires 320 are positioned radially outside of the power conductors 308*a-d*. The term "radially outside" as used herein to describe the relationship between components means that the components are positioned outside of one another in a direction from the center of the cable to the exterior of the cable; however, the components need not be aligned on a radius, although the components may be aligned on a radius. Similarly, the term "radially inside" as used herein to describe the relationship between components means that the components are positioned inside of one another in a direction from the exterior of the cable to the interior of the cable; however, the components need not be aligned on a radius, although the components may be aligned on a radius. In the illustrated embodiment, four continuity wires 320 are used where each continuity wire 320 is spaced approximately 90 degrees from the adjacent continuity wires 320 such that the four continuity wires 320 are spaced equally from one another over the 360 degree angular extent of the cable 300. It has been found that using four continuity wires 320 provides a composite power-data cable 300 where one of the continuity wires 320 will be cut before the power conductors 308*a-d* are cut. Cutting both a plus power conductor 308*a-b* and a minus power conductor 308*c-d* presents a particularly hazardous condition where arcing may create a fire hazard. Thus, positioning the continuity wires 320 such that one of the continuity wires is cut before both a plus power conductors 308*a-b* and a minus power conductor 308*c-d* is particularly advantageous.

While one embodiment using four continuity wires 320 has been shown and described as effectively cutting power to the power conductors 308*a-d* before a hazard is created, a greater or fewer number of continuity wires 320 may be used. For example, using more than four continuity wires 320 spaced around the cable 300 may provide an additional safety factor with a corresponding increase in cost. For example, in some embodiments 6 continuity wires may be used and in other embodiments 8 or even 10 continuity wires may be used. In some embodiments, three continuity wires 320 may be used spaced approximately 120 degrees from one another. The number of continuity wires 320 required for a specific cable may depend, in part, on the diameter of the cable, the location of the power conductors and the network architecture.

Figure 5:
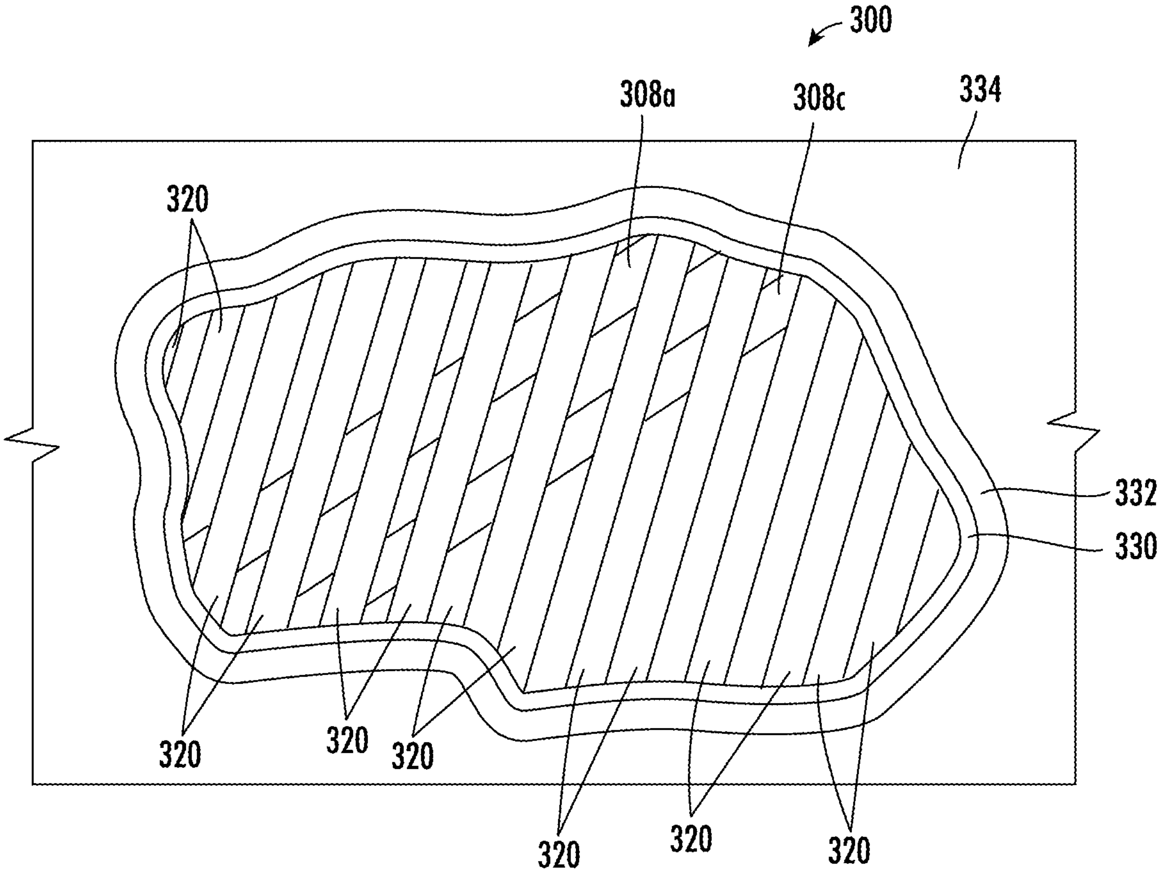
FIG. 5 is a partial cutaway side view of another embodiment of a composite power-data cable according to embodiments of the present inventive concepts.

As previously described, the power conductors 308*a-d*, filler members 310, fiber optic bundles 318 and the continuity wires 320 are arranged in a generally helical configuration. One or both of the continuity wires 320 and the power conductors 3308*a-d* may be arranged in an SZ configuration where the direction of the helix changes after a given number of turns. This creates randomness in the relationship of the position between the continuity wires 320 and the power conductors 3308*a-d*. The pitch of a helix is the height of one complete helix turn, measured parallel to the axis of the helix. In one embodiment, the pitch of the continuity wires 320 and the pitch of the power conductors 3308*a-d* may be different. In some embodiments, the pitch of the continuity wires 320 may be made significantly smaller than the pitch of the power conductors 308*a-d* such that for every one complete turn of the power conductors 308*a-d*, multiple turns of the continuity wires 320 are made as shown in FIG. 5. Certain structures of the cable 300 have been omitted from FIG. 5 in order to better illustrate the different pitches of the power conductors 308 and the continuity wires 320. In this manner, a fewer number of continuity wires 320 may cover more area of the cable 300 such that a fewer number of continuity wires 320 may be used. For example, depending upon the pitch of the continuity wires 320 two continuity wires 320 may be used. In such an embodiment, the continuity wires 320 may be disposed in a separate layer radially inside of or radially outside of the layer of fiber optic cables. While fewer continuity wires may be used in such an arrangement, the length of each continuity wire may be greater due to the increased number of turns per unit length.

The continuity wires 320 are arranged relative to the power conductors 308*a-d* such that the power conductors 308*a-d* cannot be cut without first cutting at least one of the continuity wires 320. This arrangement provides both a notification that the cable 300 has been cut even if the cut is not deep enough to penetrate to the power conductors 308*a-d* and provides a safety feature by cutting off power to the power conductors 308*a-d* in the event a cut is made in the cable 300 that would otherwise penetrate to the live power conductors 308*a-d*.

Figure 4:
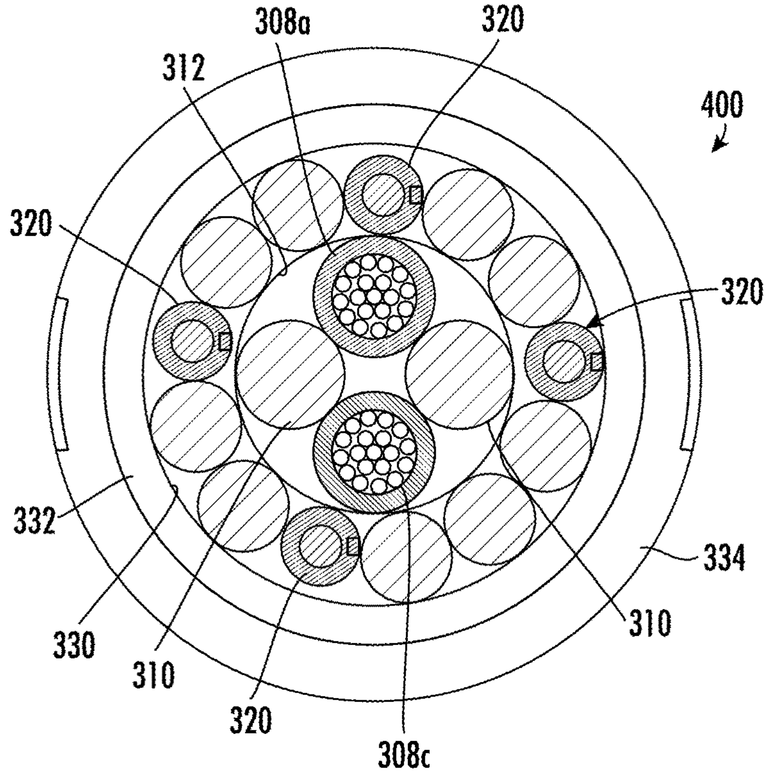
FIG. 4 is a cross-section view of a power cable according to embodiments of the present inventive concepts.
Figure 6:
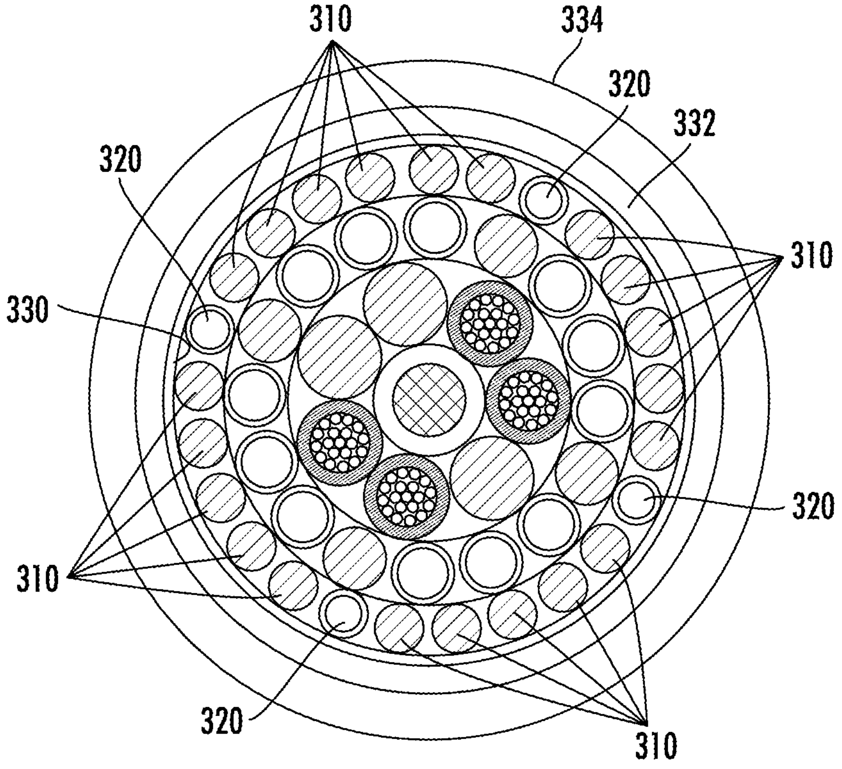
FIG. 6 is a section view showing another embodiment of a composite power-data cable according to embodiments of the present inventive concepts.

In some embodiments, the continuity wires 320 are arranged relative to the power conductors 308*a-d* such that a minus power conductor and a plus power conductor 308*a-d* cannot be cut without first cutting at least one of the continuity wires 320. In some embodiments, the continuity wires 320 are arranged such that they are approximately evenly spaced around the circumference of the cable. For example, four wires may be spaced about 90 degrees from one another, 6 wires may spaced about 60 degrees from one another, 8 wires may be spaced about 45 degrees from one another, 10 wires may be spaced about 36 degrees from one another and so on, as shown, for example, in FIG. 8. Terms such as "about" or "approximately" as used herein means plus or minus 10%. As shown in FIGS. 3 and 4, all of the continuity wires 320 are shown as being in the same layer of the cable as the optic fibers 316. However, the continuity wires 320 may be positioned in a layer separate from the other active components as shown in FIG. 6 where the continuity wires 320 are positioned radially outside of the optic fibers 316 in a separate layer of the cable 300. In such an embodiment, spacers 310 may be located in the layer with the continuity wires 320 in order to maintain the cylindrical shape of the fiber, if necessary. In FIGS. 3, 4 and 5, all of the continuity wires 320 are positioned at about the same radial distance from the center of the cable 300, i.e. in the same layer of the cable. However, all of the continuity wires 320 do not have to be positioned in the same layer of the cable. For example, the continuity wires 320 may be positioned at different radial distances from the center of the cable 300 and may be in different layers of the cable 300.

Referring to FIG. 4, an embodiment of a power cable 400 is shown. The power cable 400 is similar to the composite power-data cable 300 of FIG. 3 except that power cable 400 does not provide data capabilities and is only used as a power cable to deliver electrical power. Like reference numerals are used in FIG. 4 to identify the same or similar structures previously described with respect to FIG. 3. Power cable 400 as illustrated does not include the central member 304 of FIG. 3; however, a central member 304 as previously described may be used in the power cable 400. Likewise, the central member 304 may not be used in the power-data cable 300. Two power conductors 308*a*, 308*c* are provided. Power conductor 308*a* may be used to provide the minus voltage and power conductor 308*c* may be used to provide the plus voltage. The power conductors 308*a* and 308*c* may be constructed as described with reference to FIG. 3. While two power conductors 308*a* and 308*c* are shown in FIG. 4, four power conductors may be provided as shown in the embodiment of FIG. 3. A plurality of filler members 310 may be provided adjacent to and between the power conductors 308*a*, 308*c* to define a generally cylindrically shaped elongated member. The filler members 310 may be constructed as described with reference to FIG. 3. While two filler members 310 are shown, it is to be understood that this arrangement is for illustrative purposes and that a greater or fewer number of filler members 310 may be used and the filler members may be of the same or different diameters. The power conductors 308*a* and 308*c* and filler members 310 may be covered by a water blocking tape layer 312 as previously described.

Positioned in a layer outside of the water blocking tape layer 312 are the continuity wires 320 and additional filler members 410, if needed. Each continuity wire 320 carries low voltage communication and control signals for the system in which the cable is deployed may be constructed as previously described.

The continuity wires 320 are positioned such that a cut in the power cable 400 will sever one of the continuity wires 320 before a cut into the power conductors 308*a* and 308*c* can occur as previously described. The severing of a continuity wire 320 interrupts the communication and control signals carried by the continuity wire causing an interruption of the power delivered over the power conductors 308*a* and 308*c* to prevent potential safety and fire hazards that may result from the severing of the power conductors 308*a* and 308*c*. As explained above, the continuity wires 320 are arranged relative to the power conductors 308*a* and 308*c* such that the power conductors 308*a* and 308*c* cannot be cut without first cutting at least one of the continuity wires 320. The description of the arrangement, configuration, spacing and number of continuity wires 320 as described above with respect to the power-data cable 300 also applies to the power cable 400. In some embodiments, the continuity wires 320 are arranged relative to the power conductors 308*a* and 308*c* such that the minus power conductor and the plus power conductor 308*a* and 308*c* cannot be cut without first cutting at least one of the continuity wires 320. In some embodiments, the continuity wires 320 are arranged such that they are approximately evenly spaced around the circumference of the cable. As shown in FIG. 4 all of the continuity wires 320 are shown as being in the same layer of the cable 400, i.e. all of the continuity wires are positioned at about the same radial distance from the center of the cable 400. However, all of the continuity wires 320 do not have to be positioned in the same layer of the cable and may be positioned at different radial distances from the center of the cable 400 and may be in different layers of the cable 400.

The continuity wires 320 and fillers 410 may be covered in a water blocking tape layer 330 as previously described. A corrugated laminated aluminum tape layer 332 may surround the water blocking tape layer 330 as previously described. An outer jacket 334 surrounds the corrugated laminated aluminum tape layer 332 and forms the exterior of the hybrid power-data cable 300 as previously described.

FIG. 7 is a block diagram of a cable including N conductors and M continuity wires, according to embodiments of the present inventive concepts. N and M are integers. The cable may have, for example, N power conductors and M continuity wires. In some embodiments, M may be 2, 4, 6, 8, 10 or more even numbers of continuity wires.

Figure 8:
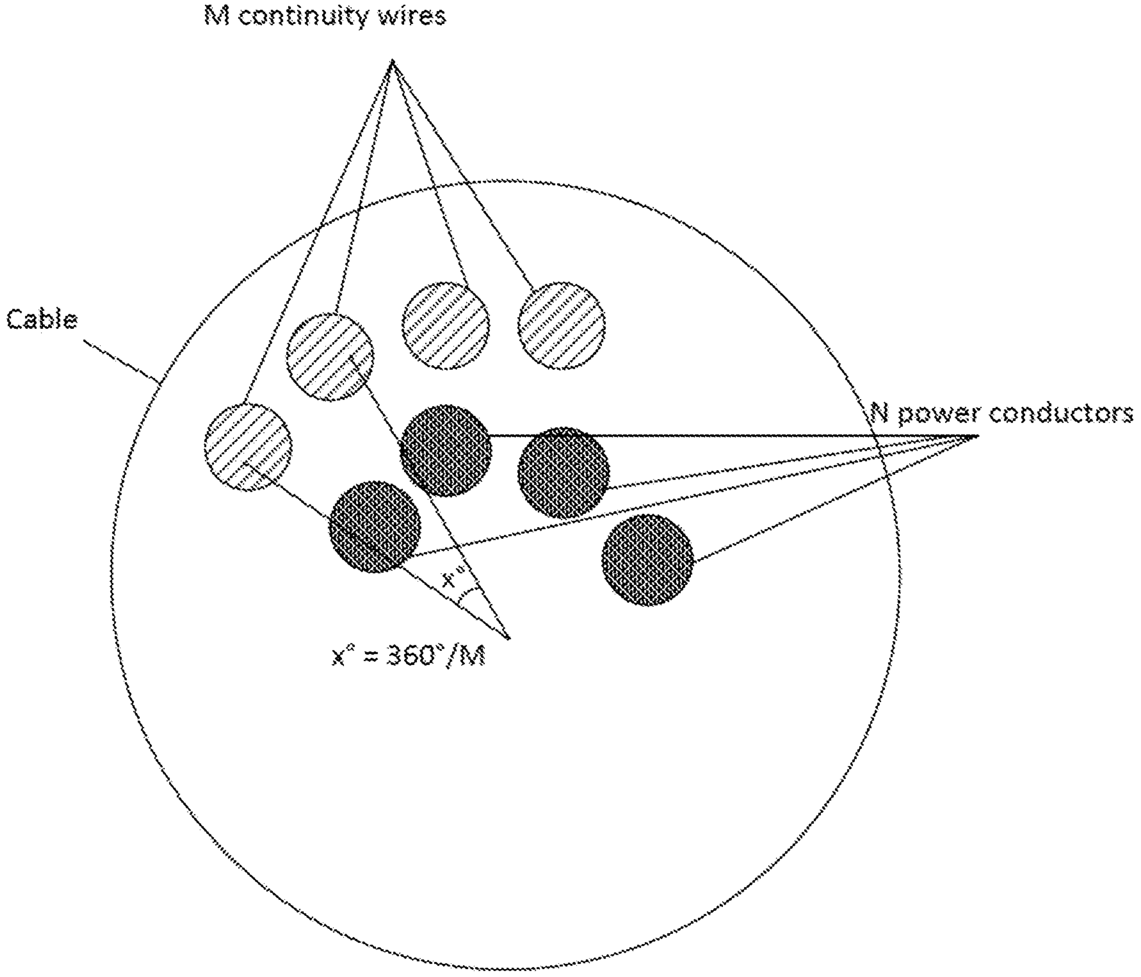
FIG. 8 is a cross-section view of a power cable illustrating angular spacing between elements, according to embodiments of the present inventive concepts.

FIG. 8 is a cross-section view of a power cable illustrating spacing between elements, according to embodiments of the present inventive concepts. The cable may include M continuity wires and N power conductors. The M continuity wires may have equal angular spacing based on the number of continuity wires, M. In other words, the angular spacing may be 360°/M. For example, four wires may be spaced about 90 degrees from one another, 6 wires may spaced about 60 degrees from one another, 8 wires may be spaced about 45 degrees from one another, 10 wires may be spaced about 36 degrees from one another and so on.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as “under,” “below,” “lower,” “over,” “upper,” “top,” “bottom,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the example term “under” can encompass both an orientation of over and under. The device may be otherwise oriented (rotated 90 degrees or at other orientations) and the spatially relative descriptors used herein interpreted accordingly.

Herein, the terms “attached,” “connected,” “interconnected,” “contacting,” “mounted,” and the like can mean either direct or indirect attachment or contact between elements, unless stated otherwise.

Well-known functions or constructions may not be described in detail for brevity and/or clarity. As used herein the expression “and/or” includes any and all combinations of one or more of the associated listed items.

The terminology used herein is for the purpose of describing particular embodiments only and is not intended to be limiting of the present inventive concepts. As used herein, the singular forms “a,” “an,” and “the” are intended to include the plural forms as well, unless the context clearly indicates otherwise. It will be further understood that the terms “comprises,” “comprising,” “includes,” and/or “including” when used in this specification, specify the presence of stated features, operations, elements, and/or components, but do not preclude the presence or addition of one or more other features, operations, elements, components, and/or groups thereof.

That which is claimed is:

1. A cable comprising:

a plurality of power conductors comprising a first power conductor, a second power conductor, a third power conductor, and a fourth power conductor; and a plurality of continuity wires positioned radially outside of the plurality of power conductors such that a cut in the cable will sever one continuity wire of the plurality of continuity wires before a cut into any one of the first power conductor, the second power conductor, the third power conductor and the fourth power conductor can occur, wherein ones of the plurality of continuity wires are configured to carry communication signals.

2. The cable of claim 1, wherein the communication signals comprise low voltage communication signals.

3. The cable of claim 1, wherein the ones of the plurality of continuity wires are further configured to carry control signals.

4. The cable of claim 3, wherein severing of the one continuity wire is configured to interrupt the communication signals and the control signals carried by the one continuity wire.

5. The cable of claim 4, wherein the severing of the one continuity wire is configured to cause an interruption of power delivered over the plurality of power conductors.

6. The cable of claim 1, wherein the plurality of continuity wires comprises 2, 4, 6, 8 or 10 continuity wires.

7. The cable of claim 1, wherein the plurality of continuity wires are spaced equally from one another.

8. A cable comprising:

a plurality of power conductors comprising a first power conductor, a second power conductor, a third power conductor, and a fourth power conductor;

a plurality of continuity wires positioned radially outside of the plurality of power conductors such that a cut in the cable will sever one continuity wire of the plurality of continuity wires before a cut into any one of the first power conductor, the second power conductor, the third power conductor and the fourth power conductor can occur; and first and second water blocking tape layers, wherein the first water blocking tape layer is between a concentric layer that includes the plurality of continuity wires and the first power conductor, the second power conductor, the third power conductor and the fourth power conductor, and wherein the second water blocking tape layer is between the concentric layer that includes the plurality of continuity wires and an outer jacket of the cable.

9. The cable of claim 8, further comprising:

a corrugated laminated aluminum tape layer that is between the second water blocking tape layer and the outer jacket of the cable.

10. A cable comprising:

a plurality of power conductors comprising a first power conductor, a second power conductor, a third power conductor, and a fourth power conductor; and a plurality of continuity wires positioned radially outside of the plurality of power conductors such that a cut in the cable will sever one continuity wire of the plurality of continuity wires before a cut into any one of the first power conductor, the second power conductor, the third power conductor and the fourth power conductor can occur, wherein ones of the plurality of continuity wires are thinner than ones of the plurality of power conductors, and wherein severing the one continuity wire is configured to interrupt a signal carried by the one continuity wire.

11. The cable of claim 10, wherein a gauge of each of the plurality of continuity wires is greater than a gauge of each of the power conductors.

12. The cable of claim 10, wherein the ones of the plurality of continuity wires comprise a stranded wire comprising individual copper strands.

13. The cable of claim 12, wherein the copper strands are jacketed in PVC with a nylon coating.

14. The cable of claim 10, wherein each of the plurality of continuity wires comprises a jacket that includes an indicia indicating that the plurality of continuity wires are not power conductors.

15. The cable of claim 10, wherein the plurality of continuity wires are spaced about 90 degrees from one another, about 60 degrees from one another, about 45 degrees from one another or about 36 degrees from one another.

16. The cable of claim 10, wherein the plurality of continuity wires comprise at least one of: four continuity wires spaced about 90 degrees from one another, 6 continuity wires spaced about 60 degrees from one another, 8 continuity wires spaced about 45 degrees from one another and 10 continuity wires spaced about 36 degrees from one another.

17. The cable of claim 10, wherein each of the plurality of continuity wires are positioned at about a same radial distance from a center of the cable.

18. The cable of claim 10, wherein the plurality of continuity wires are connected in loops such that the plurality of continuity wires are disposed as pairs where a first continuity wire and a second continuity wire of the plurality of continuity wires are arranged as a first pair forming a first loop and a third continuity wire and a fourth continuity wire of the continuity wires are arranged as a second pair forming a second loop.

19. The cable of claim 10, further comprising:

a plurality of optical fibers.

20. The cable of claim 19, wherein the plurality of optical fibers are in a same layer of the cable as the plurality of continuity wires.

21. The cable of claim 19, wherein the plurality of optical fibers are at about a same radial distance from a center of the cable as the plurality of continuity wires.

* * * * *